US005864686A

United States Patent [19]
Kaiser et al.

[11] Patent Number: 5,864,686
[45] Date of Patent: Jan. 26, 1999

[54] METHOD FOR DYNAMIC ADDRESS CODING FOR MEMORY MAPPED COMMANDS DIRECTED TO A SYSTEM BUS AND/OR SECONDARY BUSED

[75] Inventors: John M. Kaiser; Warren E. Maule, both of Cedar Park, Tex.

[73] Assignee: International Business Machines Corporation, Armonk, N.Y.

[21] Appl. No.: 751,351

[22] Filed: Nov. 19, 1996

[51] Int. Cl.$^6$ ............................................. G06F 13/00
[52] U.S. Cl. ........................ 395/308; 395/306; 395/287
[58] Field of Search ................................. 395/287, 293, 395/306, 308, 853, 860

[56] References Cited

U.S. PATENT DOCUMENTS

| | | | |
|---|---|---|---|
| 4,279,034 | 7/1981 | Baxter | 371/8 |
| 4,340,932 | 7/1982 | Bakula et al. | 364/200 |
| 4,511,964 | 4/1985 | Georg et al. | 364/200 |
| 4,535,404 | 8/1985 | Shenk | 364/200 |
| 4,785,453 | 11/1988 | Chandran et al. | 371/68 |
| 4,979,106 | 12/1990 | Schneider | 364/200 |
| 4,991,085 | 2/1991 | Pleva et al. | 364/200 |
| 4,996,688 | 2/1991 | Byers et al. | 371/16.5 |
| 5,168,566 | 12/1992 | Kuki et al. | 395/673 |
| 5,201,055 | 4/1993 | Izquierdo et al. | 395/800 |
| 5,249,187 | 9/1993 | Bruckert et al. | 371/68.1 |
| 5,271,020 | 12/1993 | Marisetty | 371/30 |
| 5,307,466 | 4/1994 | Chang | 395/325 |
| 5,313,476 | 5/1994 | Haberkorn, Jr. et al. | 371/61 |
| 5,335,329 | 8/1994 | Cox et al. | 395/325 |
| 5,448,725 | 9/1995 | Gervais | 395/184.01 |
| 5,557,758 | 9/1996 | Bland et al. | 395/308 |
| 5,608,878 | 3/1997 | Arimilli et al. | 398/287 |

OTHER PUBLICATIONS

Aichelman, Jr., IBM Technical Disclosure Bulletin, vol. 30, No. 8, pp. 324–326 (Jan. 1988).
Berglund et al, IBM Technical Disclosure Bulletin, vol. 32, No. 6A, pp. 153–163 (Nov. 1989).
Bland et al, IBM Technical Disclosure Bulletin, vol. 32, No. 10A, pp. 184–186 (Mar. 1990).
Pita et al, IBM Technical Disclosure Bulletin, vol. 37, No. 02B, pp. 59–63 (Feb. 1994).

*Primary Examiner*—Meng-Ai T. An
*Assistant Examiner*—Rupal D. Dharia
*Attorney, Agent, or Firm*—Richard A. Henkler; Daniel E. Venglarik; Andrew J. Dillon

[57] ABSTRACT

In a data processing system including a system bus supporting memory mapped devices, dynamic response to a memory mapped command is achieved by receiving a status response from each device attached to the system bus and comparing a priority associated with each such status response to a predetermined priority. If a priority associated with the status response from one of the devices equals or exceeds the predetermined priority, indicating that the address in the memory mapped command is acknowledged in some form by that device, the status response from that device is forwarded to all devices attached to the system bus. If no status response received from the devices has an associated priority equalling or exceeding the predetermined priority, the address is acknowledged and the memory mapped command accepted and forwarded to a lower bus. If the memory mapped command is not accepted by the lower bus, dummy data is returned and a machine check is signaled.

16 Claims, 3 Drawing Sheets

METHOD FOR DYNAMIC ADDRESS CODING FOR MEMORY MAPPED COMMANDS DIRECTED TO A SYSTEM BUS AND/OR SECONDARY BUSED

BACKGROUND OF THE INVENTION

1. Technical Field

The present invention relates in general to attaching memory mapped devices to a multilevel bus hierarchy and in particular to allowing memory mapped devices to be attached to any level of a multilevel bus hierarchy. Still more particularly, the present invention relates to forwarding memory mapped commands to lower levels of a multilevel bus hierarchy without precluding attachment of memory mapped devices to higher levels of the bus hierarchy.

2. Description of the Related Art

Memory mapped devices in a data processing system use a portion of the date processing system's total memory address space for their input/output (I/O) address space rather than using a dedicated I/O address space. As is known in the art, use of memory mapped devices avoids the requirement of extra signals to identify or select devices and allows all processor instructions, rather than merely a limited set, to be used in conjunction with the device.

A common problem for data processing systems using memory mapped devices is the potential for decoding conflicts by multiple devices. Many data processing systems attach several memory mapped devices to secondary or tertiary buses attached to the system bus through a system memory controller. The system memory controller normally acknowledges all memory addresses and passes operations with memory addresses which it does not actually control to the buses below it. If the buses below do not accept the operation passed by the system memory controller, some error condition is asserted to the processor(s) on the system bus.

The method described above works if the bus hierarchy contains no memory mapped devices or buses above or at the same hierarchy level as the system memory controller. If additional devices are added to the bus hierarchy at or above the level of the system memory controller, addresses for these devices cannot be acknowledged by the system memory controller.

It would be desirable, in a system including secondary or tertiary buses attached to a system memory controller, to allow operations with memory addresses for devices on the secondary or tertiary buses to be passed below the system memory controller while allowing additional devices or buses to be attached to the system bus at a level equal to or above the system memory controller in the bus hierarchy. It would further be desirable to dynamically forward memory mapped commands to the appropriate memory mapped devices anywhere in the bus hierarchy.

It would also be desirable to allow the addition, at a later time or in other configuration, of other devices at or above the bus level of the I/O bridge connecting the secondary bus with the system bus without requiring either changes to the system memory controller hardware (adding decoding range registers or look up tables, etc.) to permit such later additions or other configurations or different programming of the system memory controller for different configurations.

SUMMARY OF THE INVENTION

It is therefore one object of the present invention to provide a method and apparatus for attaching memory mapped devices to a multilevel bus hierarchy.

It is another object of the present invention to provide a method and apparatus allowing memory mapped devices to be attached to any level of a multilevel bus hierarchy.

It is yet another object of the present invention to provide a method and apparatus for forwarding memory mapped commands to lower levels of a multilevel bus hierarchy without precluding attachment of memory mapped devices to higher levels of the bus hierarchy.

The foregoing objects are achieved as is now described. In a data processing system including a system bus supporting memory mapped devices, dynamic response to a memory mapped command is achieved by receiving a status response from each other device attached to the system bus and comparing a priority associated with each such status response to a predetermined priority. If a priority associated with the status response from one of the other devices exceeds the predetermined priority, indicating that the address in the memory mapped command is acknowledge in some form by that device, the status response from that device is forwarded to all other devices attached to the system bus. If status response received from other devices has an associated priority not exceeding the predetermined priority, the address is acknowledged and the memory mapped command accepted and forwarded to a lower bus. If the memory mapped command is not accepted by the lower bus, dummy data is returned and a machine check is signaled.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
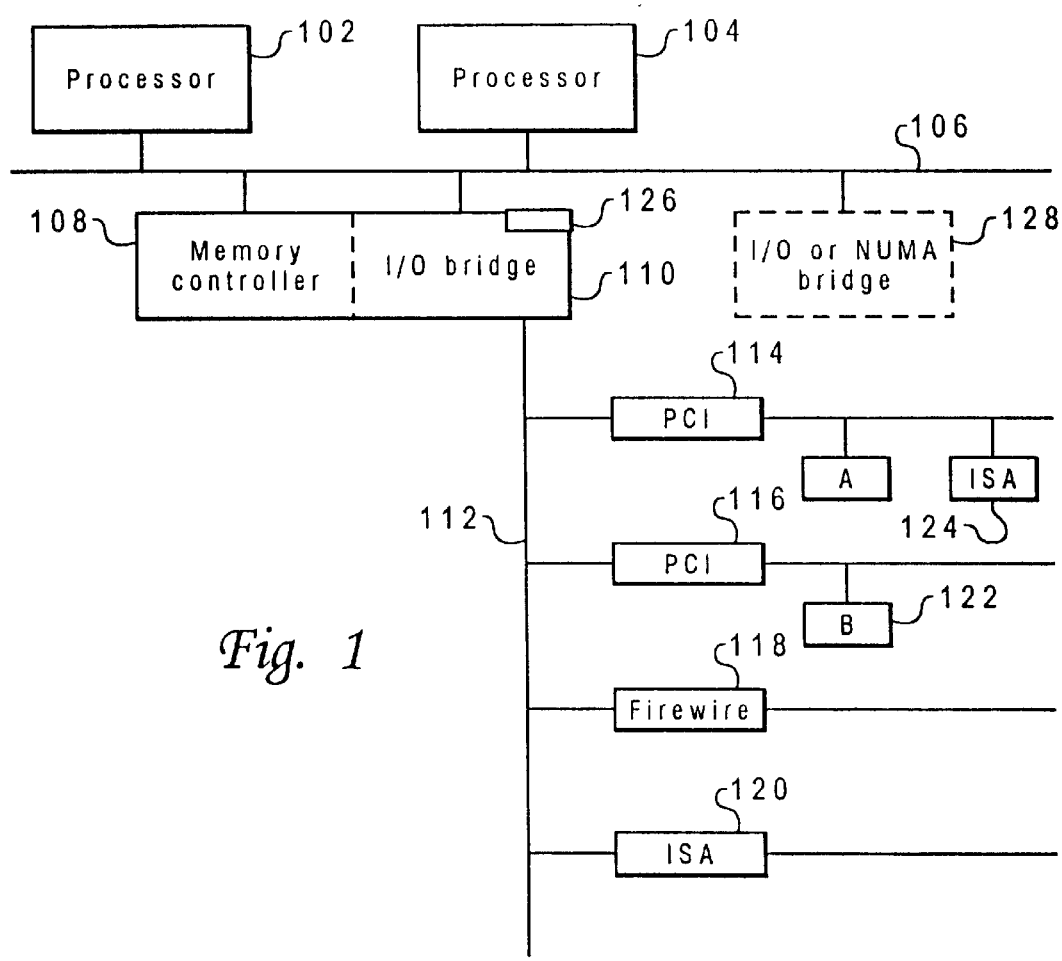
FIG. 1 depicts a block diagram of a data processing system in which a preferred embodiment of the present invention is implemented.

With reference now to the figures, and in particular with reference to FIG. 1, a block diagram of a data processing system in which a preferred embodiment of the present invention is implemented is depicted. The data processing system may include multiple processors 102 and 104 attached to the system bus 106. Also connected to primary system bus 106 is a system memory controller 108, which preferably includes an integral I/O bridge 110. I/O bridge 110 serves as the point at which a secondary bus 112 attaches to the primary system bus 106. Secondary bus 112 may have a number of tertiary buses attached through various interfaces, such as PCI bus interfaces 114 and 116, firewire interface 118, or ISA bus interface 120. Each of these bus architectures are known to those in the art and have clearly defined specifications. The tertiary buses may have an attached device 122, which may or may not be memory mapped, or may include an interface or adapter 124 to other bus architectures.

In accordance with a preferred embodiment of the present invention, I/O bridge 110 also includes combining logic 126. It is this combining logic 126, described in greater detail below, which permits memory mapped commands to be passed to devices connected to secondary bus 112 while allowing additional devices to be attached to primary system bus 106. New devices which a user might wish to attach to system bus 106 might include a non-uniform memory access (NUMA) interface 128 or other devices such as a high speed I/O interface or a memory mapped graphics adapter.

Figure 2:
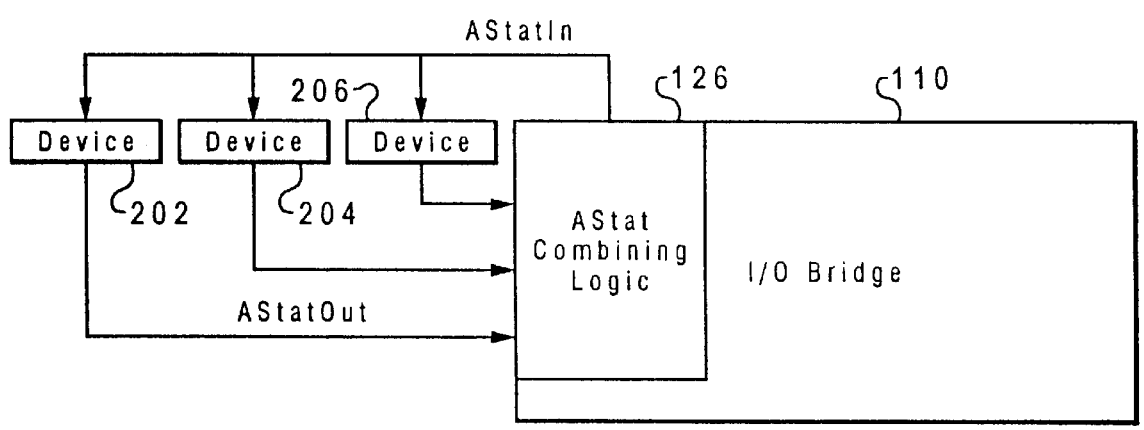
FIG. 2 is a block diagram of the combining logic of a system memory controller in accordance with a preferred embodiment of the present invention.

Referring to FIG. 2, a block diagram of the combining logic of a system memory controller in accordance with a preferred embodiment of the present invention is illustrated. In this example, combining logic 126 within I/O bridge 110 receives status signals from other devices 202, 204, and 206 attached to the system bus and returns status signals to the same devices. Devices 202, 204, and 206 attached to the system bus may be processors or memory mapped devices. At least one of the other bus participants 202, 204, and 206 must be the processor which originates the memory mapped command to be handled.

Combining logic 126 within I/O bridge 110 receives and sends status signals to other devices 202, 204, and 206 using several lines of the system bus. In order to maximize the number of bus attachments while allowing attachment of CMOS logic devices directly to the system bus, status responses ("AStatOut") from each bus participant (devices 202, 204, and 206) are driven to a common collection point, which combines all response and returns the combined response ("AStatin") to all participants. In a preferred embodiment of the present invention, combining logic 126 receives and combines the status responses ("AStatOut") of the bus participants. Combining logic 126 also prioritizes the responses, since different bus participants may be signaling different responses. Combining logic 126 of the I/O bridge 110 in system memory controller 108 thus sees the status responses of all bus participants, devices 202, 204, and 206 before generating the combined status response ("AStatin"), which includes its own status response (i.e., the status response of the I/O bridge 110 in which combining logic 126 is contained).

Preferably, the lines used for communication between combining logic 126 and other devices 202, 204, and 206 are tristated lines, or lines which are resistively coupled to an active state and which may be asserted by one or more devices attached to the tristated line by the device pulling the line to an inactive state. Tristated lines are well known to those in the art and provide faster transitions between asserted and nonasserted conditions, which is required for today's high speed buses.

Figure 3:
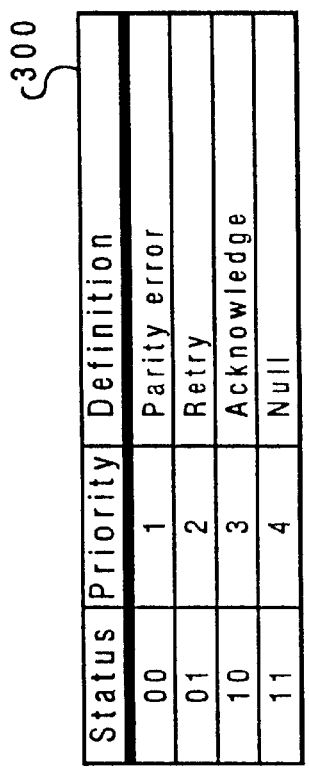
FIG. 3 depicts a table of the status signals sent or received by system memory controller combining logic in accordance with a preferred embodiment of the present invention.

With reference now to FIG. 3, a table 300 of the status messages sent or received by system memory controller combining logic in accordance with a preferred embodiment of the present invention is depicted. Each status message has an associated priority and definition. An address parity error indicates that bad parity was detected for the previous address or control information and has the highest priority in the depicted example. A retry response is used for flow control and to indicate that the requested resources may be busy, and has the second highest priority in the depicted example. An address acknowledge response indicates that the operation or request has been decoded properly and has been accepted. A null response indicates that the operation or command encoding the address was not accepted by one or more of the bus devices and has the lowest priority in the depicted example.

Referring again to FIG. 2, combining logic 126 receives the status responses from other devices 202, 204, and 206 two bus cycles after the command or request encoding a memory address. As noted earlier, combining logic 126 of the system memory controller sees the status responses of all other devices 202, 204, and 206 before combining those responses with its own to generate the combined status response returned to other devices 202, 204, and 206. The combined status response returned by combining logic 126 includes the status response of I/O bridge 110.

In response to memory mapped commands on the system bus, combining logic 126 determines if one of the other bus participants 202, 204, and 206 is acknowledging the address in the command. Any status response from one of the other bus participants 202, 204, and 206 having a priority equal to or higher than the address acknowledge response (i.e., any status response other than a null response) is forwarded by combining logic 126 to the other bus participants 202, 204, and 206. If multiple status responses having a priority higher than a null response are received by combining logic 126 from the other bus participants 202, 204, and 206, the highest priority status response is forwarded.

I/O bridge 110 is, itself, a bus participant. If no status responses with an associated priority higher than a null response is received from the other bus participants 202, 204, and 206, I/O bridge 110 asserts an address acknowledge response of its own. I/O bridge 110 then accepts and forwards the memory mapped operations to the buses below the system memory controller in the bus hierarchy. Thus, unless another bus participant 202, 204, or 206 acknowledges the address in the memory mapped command in some form, even through a retry or parity error response, I/O bridge 110 will always acknowledge the address and forward the operation to lower buses.

If an address accepted by I/O bridge 110 is not accepted in the lower levels of the bus hierarchy, I/O bridge 110 returns dummy data and signals a machine check. Such occurrences should be rare, however, since addresses which are not acknowledge by bus participants at a level equal to or higher than the system memory controller should map to device in the lower bus hierarchy levels.

Figure 4:
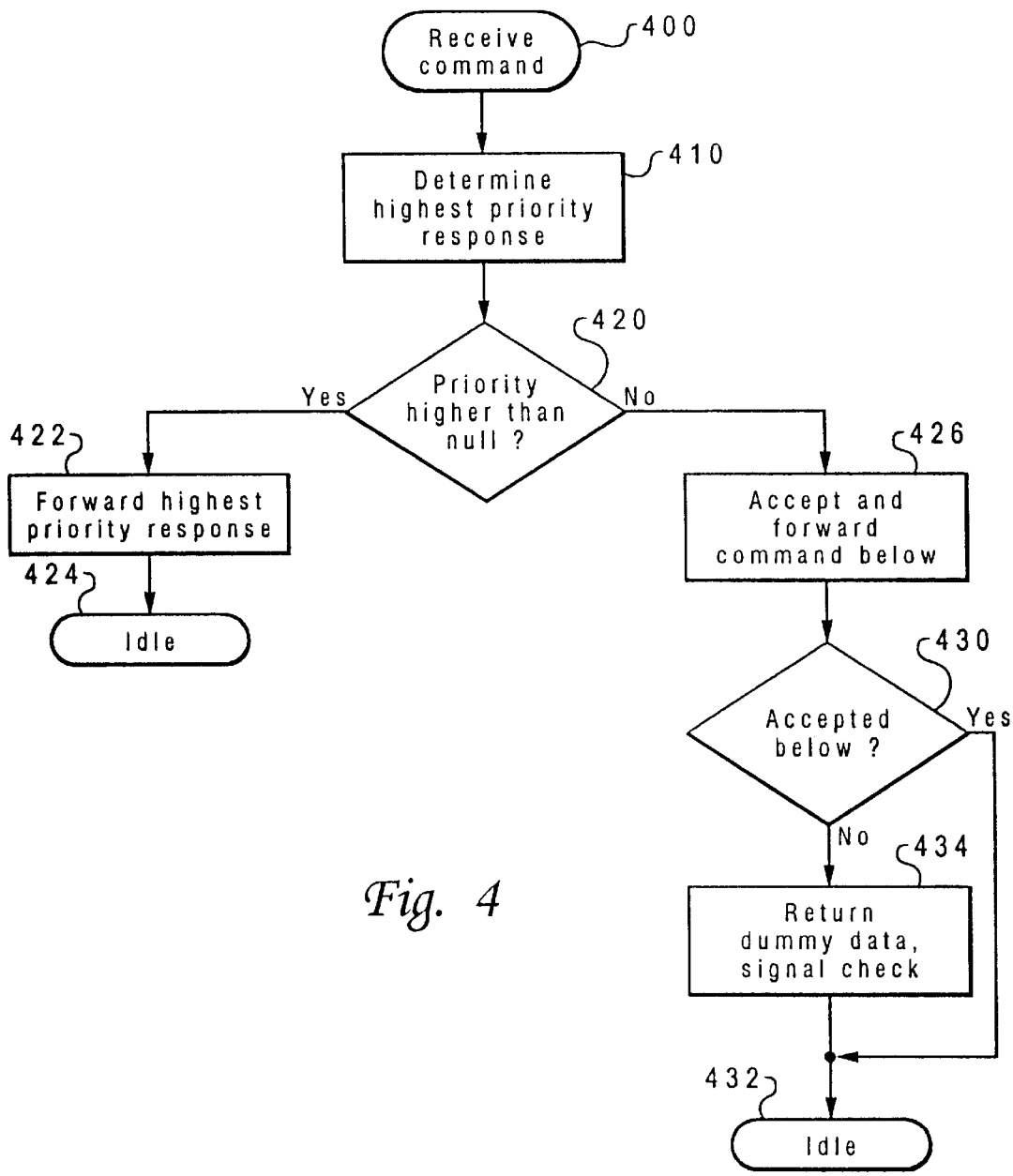
FIG. 4 is a high level flowchart for a process by which responses to a memory mapped command are generated in accordance with a preferred embodiment of the present invention.

Referring to FIG. 4, a high level flowchart for a process by which responses to a memory mapped command are generated in accordance with a preferred embodiment of the present invention is illustrated. The process begins at step 400, which illustrates receipt of a memory mapped command by the bus participants. The process then passes to step 410, which depicts a determination of the highest priority response received from all bus participants, including the I/O bridge including the combining logic. The process then passes to step 420, which illustrates a determination of whether a response received from another bus participant has an associated priority higher than a null response. If so, the process proceeds to step 422, which depicts forwarding the highest priority response to the other bus participants, and then to step 424, which illustrates the process becoming idle until the next memory mapped command is received.

Referring again to step 420, if no response with a priority higher than null priority is received from the other bus participants, the process passes instead to step 426, which depicts the I/O bridge containing the combining logic acknowledging the address, accepting the operation, and forwarding the operation to lower level buses. The process then proceeds to step 430, which illustrates a determination of whether the memory mapped command was accepted by a device on one of the buses below. If so, the process passes to step 432, which depicts the process becoming idle until the next memory mapped command is received. If not, the process passes first to step 434, which illustrates returning dummy data and signaling a machine check, and then to step 432, which depicts the process becoming idle as described above.

Figure 5:
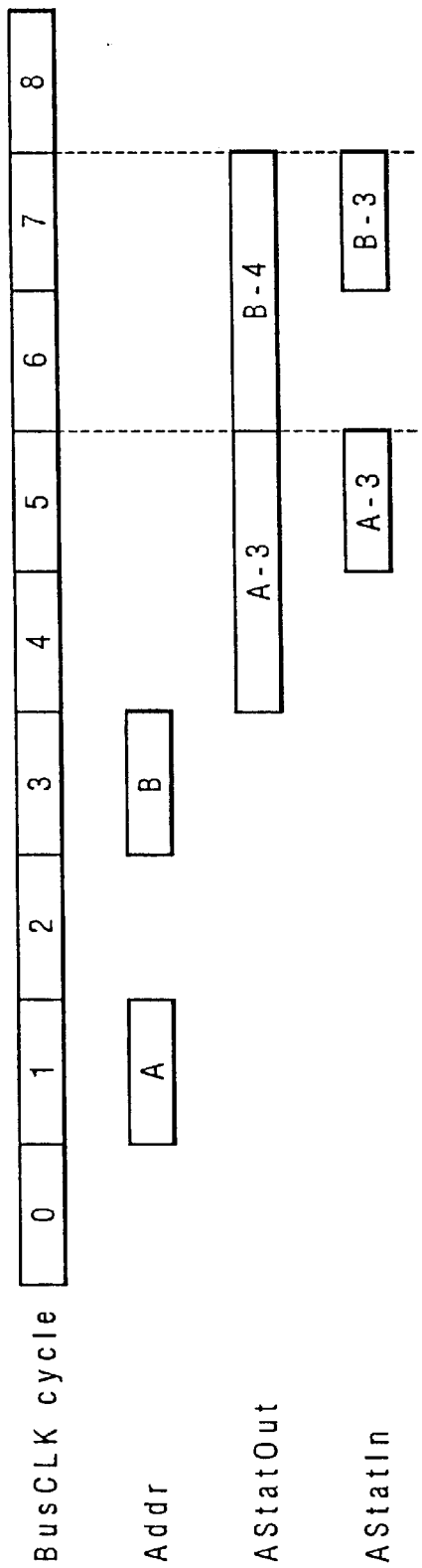
FIG. 5 depicts a timing diagram for address acknowledgement signals in accordance with a preferred embodiment of the present invention.

With reference now to FIG. 5, a timing diagram for address acknowledgement signals in accordance with a preferred embodiment of the present invention is depicted. In the depicted example, a memory mapped command for the device at address A is asserted during bus clock cycle ("BusCLK cycle") 1. Two bus cycles later, during bus clock cycle 4, one of the bus participant acknowledges the address A, which has an associated priority of 3 ("A-3"). Thus the combining logic of the I/O bridge returns an address acknowledge for address A ("A-3") to all other bus participants during bus clock cycle 5. The bus participant which acknowledged address A will respond to the memory mapped command.

During bus clock cycle 3 in the depicted example, a memory mapped command for the device at address B is asserted. Two bus cycles later, during bus clock cycle 6, no bus participant—including the I/O bridge which contains the combining logic—has asserted anything other than a null response ("B-4"). Therefore the I/O bridge containing the combining logic asserts an acknowledge response ("B-3") to all other bus participants. The memory mapped command is then passed below.

It should be noted that address acknowledge, with the associated priority of 3, is the lowest priority response which I/O bridge will return in the event all other bus participants return a null response. If the I/O bridge is busy, it will instead return a retry response, with the associated priority of 2. If the I/O bridge detects a parity error, it will return a parity error response which has the highest priority. However, where all other bus participants return a null response to a memory mapped command, the I/O bridge will always assert a response of at least priority 3 (address acknowledge). If the I/O bridge sends a retry response, when the same memory mapped command is again asserted the I/O bridge will again respond with at least the priority of an address acknowledge response. If the I/O bridge sends a parity error response, re-assertion of the same memory mapped command may result in a response other than a null response from one of the other bus participants; when the parity error is eliminated, one of the other bus participants may detect its address. If not, the I/O bridge will again respond with at least the priority of an address acknowledge response.

The simple technique of "watching" for the null address status response before accepting commands allows the use of a subtractive decoding method in a bus hierarchy yet still allows the addition, at a later time or in other configuration, of other devices at or above the bus level of the I/O bridge connecting the secondary bus with the system bus. The system memory controller hardware need not be changed (adding decoding range registers or look up tables, etc.) to permit such later additions or other configurations, nor need the system memory controller be programmed differently for different configurations.

While the invention has been particularly shown and described with reference to a preferred embodiment, it will be understood by those skilled in the art that various changes in form and detail may be made therein without departing from the spirit and scope of the invention.

We claim:

1. A method, in a data processing system including a system bus and a secondary bus connected to said system bus by a bridge, both buses supporting memory mapped devices, of dynamically responding to a memory mapped command, comprising:

detecting a memory mapped command on said system bus;

receiving a status response from each memory mapped device within a plurality of devices attached to said system bus;

comparing a priority associated with each said status response to a predetermined priority;

in response to determining that a priority associated with a status response from one memory mapped device within said plurality of devices equals or exceeds said predetermined priority, forwarding said status response from said one memory mapped device to each memory mapped device within said plurality of devices; and in response to determining that no priority associated with a status response from a memory mapped device within said plurality of devices equals or exceeds said predetermined priority:

forwarding a status response from the bridge, with an associated priority of at least said predetermined priority to each memory mapped device within said plurality of devices, accepting the memory mapped command, and forwarding the memory mapped command to said secondary bus.

2. The method of claim 1 wherein said step of forwarding a status response with an associated priority of at least said predetermined priority further comprising forwarding an address acknowledge status response.

3. The method of claim 1 wherein said step of forwarding a status response with an associated priority of at least said predetermined priority further comprising forwarding a retry status response.

4. The method of claim 1 wherein said step of forwarding a status response with an associated priority of at least said predetermined priority further comprising forwarding a parity error status response.

5. The method of claim further comprising:

in response to determining that said memory mapped command was not accepted by said secondary bus, signaling a machine check.

6. The method of claim 1 wherein said step of determining that no priority associated with a response from a memory mapped device within said plurality of devices equals or exceeds said predetermined priority further comprises:

detecting a null status response by each memory mapped device within said plurality of devices.

7. The method of claim 1 wherein said step of receiving a status response from each memory mapped device within a plurality of devices includes receiving a null status response from at least one memory mapped device within said plurality of devices.

8. The method of claim 1 wherein said step of receiving a status response from each memory mapped device within a plurality of devices includes receiving an address acknowledge status response from at least one memory mapped device within said plurality of devices.

9. The method of claim 1 wherein said step of receiving a status response from each memory mapped device within a plurality of devices includes receiving a retry status response from at least one memory mapped device within said plurality of devices.

10. The method of claim 1 wherein said step of receiving a status response from each memory mapped device within a plurality of devices includes receiving a parity error status response from at least one memory mapped device within said plurality of devices.

11. An apparatus in a data processing system including a system bus and a secondary bus connected to said system bus by a bridge, both buses supporting memory mapped devices, for dynamically responding to a memory mapped command, comprising:

detection means for detecting a memory mapped command on said system bus;

passing means for passing said memory mapped command to said secondary bus;

receiving means for receiving a status response from each memory mapped device within a plurality of devices attached to said secondary bus;

comparing means for comparing a priority associated with each said status response to a predetermined priority;

means, responsive to determining that a priority associated with a status response from one memory mapped device within said plurality of devices equals or exceeds said predetermined priority, for forwarding said status response from said one memory mapped device to each memory mapped device within said plurality of devices; and means, responsive to determining that no priority associated with a status response from a memory mapped device within said plurality of devices equals or exceeds said predetermined priority, for:

forwarding a status response from the bridge, with an associated priority of at least said predetermined priority to each memory mapped device within said plurality of devices, accepting the memory mapped command, and forwarding the memory mapped command to said secondary bus.

12. The apparatus of claim 11 wherein said forwarding means further comprises means for forwarding a status response selected from the group of an address acknowledge status response, a retry status response, and a parity error status response.

13. The apparatus of claim 12 further comprising:

signaling means, responsive to determining that said memory mapped command was not accepted by said secondary bus, for signaling a machine check.

14. The apparatus of claim 11 wherein said receiving means for receiving a status response from each memory mapped device within a plurality of devices further comprises means for receiving a status response selected from the group of a null status response, an address acknowledge status response, a retry status response, and a parity error status response.

15. An improved data processing system, comprising:

a system bus connecting a plurality of devices, said plurality of devices including a system memory controller; and an I/O bridge within said system memory controller connecting a secondary bus to said system bus, said I/O controller including a combining logic portion;

wherein one device within said plurality of devices transmits memory mapped commands to each other device within said plurality of devices via said system bus, each memory mapped device within said plurality of devices transmits a response to said memory mapped command to said combining logic portion via said system bus, said combining logic portion compares a priority associated with said response from each memory mapped device within said plurality of devices to a predetermined priority, said combining logic portion, responsive to determining that a priority associated with a response from one memory mapped device within said plurality of devices equals or exceeds said predetermined priority, transmits said response from said one memory mapped device to each device within said plurality of devices via said system bus, and responsive to determining that no priority associated with a response from a memory mapped device within said plurality of devices equals or exceeds said predetermined priority, said combining logic:

transmits a response from the I/O bridge, having an associated priority of at least said predetermined priority to each memory mapped device within said plurality of devices, accents said memory mapped command, and forwards said memory mapped command to said secondary bus.

16. The improved data processing system of claim 15, wherein said predetermined priority comprises a priority associated with a response acknowledging said memory mapped command.

* * * * *

UNITED STATES PATENT AND TRADEMARK OFFICE
CERTIFICATE OF CORRECTION

PATENT NO. : 5,864,686
DATED : Jan. 26, 1999
INVENTOR(S) : *Kaiser et al.*

It is certified that error appears in the above-identified patent and that said Letters Patent is hereby corrected as shown below:

On the title page, item [54] and column 1, lines 1-4, the title should read: "METHOD FOR DYNAMIC ADDRESS CODING FOR MEMORY MAPPED COMMANDS DIRECTED TO A SYSTEM BUS AND/OR SECONDARY BUS."

In col. 3, line 51, please change " ("AStatin") " to -- ("AStatIn") --.

In col. 6, line 53 (Claim 5), please add the numeral --1-- after the word "claim".

In col. 8, line 47, (Claim 15), please delete "accents" and insert --accepts--.

Signed and Sealed this

Thirty-first Day of August, 1999

Q. TODD DICKINSON

*Attest:*

*Attesting Officer*     *Acting Commissioner of Patents and Trademarks*